US007415106B2

(12) United States Patent
Chang

(10) Patent No.: US 7,415,106 B2
(45) Date of Patent: Aug. 19, 2008

(54) NETWORK-BASED VOICE ACTIVATED AUTO-ATTENDANT SERVICE WITH B2B CONNECTORS

(75) Inventor: Hisao M. Chang, Austin, TX (US)

(73) Assignee: SBC Knowledge Ventures, LP, Reno, NV (US)

( * ) Notice: Subject to any disclaimer, the term of this patent is extended or adjusted under 35 U.S.C. 154(b) by 238 days.

(21) Appl. No.: 10/796,400

(22) Filed: Mar. 9, 2004

(65) Prior Publication Data

US 2005/0201532 A1 Sep. 15, 2005

(51) Int. Cl.
*H04M 3/00* (2006.01)
(52) U.S. Cl. .............................. 379/265.02; 379/88.01; 379/88.17; 379/88.18; 700/1; 704/7; 704/9; 704/10; 705/57; 709/202; 709/203; 709/247; 726/21; 726/23; 726/30
(58) Field of Classification Search ............ 379/265.02, 379/88.01–88.02, 88.04, 88.17, 88.18; 700/1; 704/2, 7, 9, 10; 705/50, 51, 57; 709/201–203, 709/246–247; 726/21–23, 30
See application file for complete search history.

(56) References Cited

U.S. PATENT DOCUMENTS

| 5,822,539 | A | 10/1998 | van Hoff |
| 5,933,822 | A | 8/1999 | Braden-Harder et al. |
| 5,970,490 | A * | 10/1999 | Morgenstern ................. 707/10 |
| 5,974,413 | A | 10/1999 | Beauregard et al. |
| 6,182,029 | B1 | 1/2001 | Friedman |
| 6,269,337 | B1 * | 7/2001 | Desmond et al. ......... 704/270.1 |
| 6,295,529 | B1 | 9/2001 | Corston-Oliver et al. |
| 6,385,600 | B1 | 5/2002 | McGuinness et al. |
| 6,397,212 | B1 | 5/2002 | Biffar |
| 6,397,219 | B2 | 5/2002 | Mills |
| 6,434,547 | B1 | 8/2002 | Mishelevich et al. |
| 6,438,545 | B1 | 8/2002 | Beauregard et al. |
| 6,457,002 | B1 | 9/2002 | Beattie et al. |
| 6,466,940 | B1 | 10/2002 | Mills |
| 6,484,177 | B1 | 11/2002 | Van Huben et al. |
| 6,505,160 | B1 | 1/2003 | Levy et al. |
| 6,509,910 | B1 | 1/2003 | Agarwal et al. |
| 6,516,337 | B1 | 2/2003 | Tripp et al. |
| 6,519,617 | B1 | 2/2003 | Wanderski et al. |

(Continued)

*Primary Examiner*—Fan Tsang
*Assistant Examiner*—Hemant S. Patel
(74) *Attorney, Agent, or Firm*—Toler Law Group

(57) ABSTRACT

In a particular embodiment, a method of processing enterprise information system data for use by a voice activated auto-attendant service network is disclosed. The method includes provisioning a network-based voice activated auto-attendant service via a web interface including downloading a platform independent business to business (B2B) connector package, interacting with the connector package via a sequence of data modeling steps, selecting a connector based on an enterprise information system data source, and configuring the selected connector. The method also includes encrypting XML data files using an encryption key issued by a network based voice activated auto-attendant service provider, uploading the encrypted XML data files to a secured website hosted on a voice activated auto-attendant service provider network, and parsing the encrypted XML data files at a data processor within the network based voice activated auto-attendant service system to construct a voice directory and to create a first database and to create a second database. The first database and the second database are configured for run-time access of the voice activated auto-attendant system.

16 Claims, 7 Drawing Sheets

U.S. PATENT DOCUMENTS

| | | | |
|---|---|---|---|
| 6,549,612 B2 | 4/2003 | Gifford et al. | |
| 6,587,822 B2 * | 7/2003 | Brown et al. | 704/275 |
| 6,625,258 B1 | 9/2003 | Ram et al. | |
| 6,629,097 B1 | 9/2003 | Keith | |
| 6,636,831 B1 | 10/2003 | Profit, Jr. et al. | |
| 6,643,652 B2 | 11/2003 | Helgeson et al. | |
| 6,654,722 B1 | 11/2003 | Aldous et al. | |
| 6,654,747 B1 | 11/2003 | Van Huben et al. | |
| 6,658,414 B2 | 12/2003 | Bryan et al. | |
| 6,658,625 B1 * | 12/2003 | Allen | 715/523 |
| 6,704,396 B2 | 3/2004 | Parolkar et al. | |
| 6,714,992 B1 | 3/2004 | Kanojia et al. | |
| 6,718,371 B1 | 4/2004 | Lowry et al. | |
| 6,721,727 B2 | 4/2004 | Chau et al. | |
| 6,721,747 B2 | 4/2004 | Lipkin | |
| 6,731,737 B2 * | 5/2004 | Davis et al. | 379/218.01 |
| 6,732,090 B2 | 5/2004 | Shanahan et al. | |
| 6,745,161 B1 | 6/2004 | Arnold et al. | |
| 6,778,979 B2 | 8/2004 | Grefenstette et al. | |
| 6,804,330 B1 * | 10/2004 | Jones et al. | 379/88.01 |
| 6,956,848 B1 * | 10/2005 | Keung et al. | 370/356 |
| 6,999,930 B1 * | 2/2006 | Roberts et al. | 704/270.1 |
| 2002/0146015 A1 | 10/2002 | Bryan et al. | |
| 2002/0169604 A1 | 11/2002 | Damiba et al. | |
| 2002/0169605 A1 | 11/2002 | Damiba et al. | |
| 2002/0169611 A1 | 11/2002 | Guerra et al. | |
| 2003/0088421 A1 | 5/2003 | Maes et al. | |
| 2003/0115353 A1 | 6/2003 | Deryugin et al. | |
| 2003/0123618 A1 * | 7/2003 | Bhargava et al. | 379/88.01 |
| 2003/0231747 A1 * | 12/2003 | Creamer et al. | 379/88.17 |
| 2004/0019638 A1 | 1/2004 | Makagon et al. | |
| 2004/0088186 A1 * | 5/2004 | Anvekar et al. | 705/1 |
| 2004/0141596 A1 * | 7/2004 | Crockett et al. | 379/88.17 |

* cited by examiner

NETWORK-BASED VOICE ACTIVATED AUTO-ATTENDANT SERVICE WITH B2B CONNECTORS

FIELD OF THE DISCLOSURE

The present disclosure relates generally to a network based auto attendant system and services relating thereto.

BACKGROUND

Early work in voice activated auto-attendant technologies is based on customer premise equipment (CPE) platforms where a voice dial directory is built for a specific company. The data source for the directory is often limited to simple name dialing. This type of CPE-based auto-attendant application typically does not offer the caller advanced search capability via voice commands.

More recent systems use statistical analysis techniques to improve automatic speech recognition (ASR) performance on large company directories that may contain hundreds of thousands of employees and/or associates. However, these systems do not use web-centric data interface technologies to access corporate data and do not take advantage of relationship intelligence often embedded in individual enterprise information technology (IT) systems.

Accordingly, there is a need for an improved system and method of providing network-based voice services.

DETAILED DESCRIPTION OF THE DRAWINGS

Figure 1:
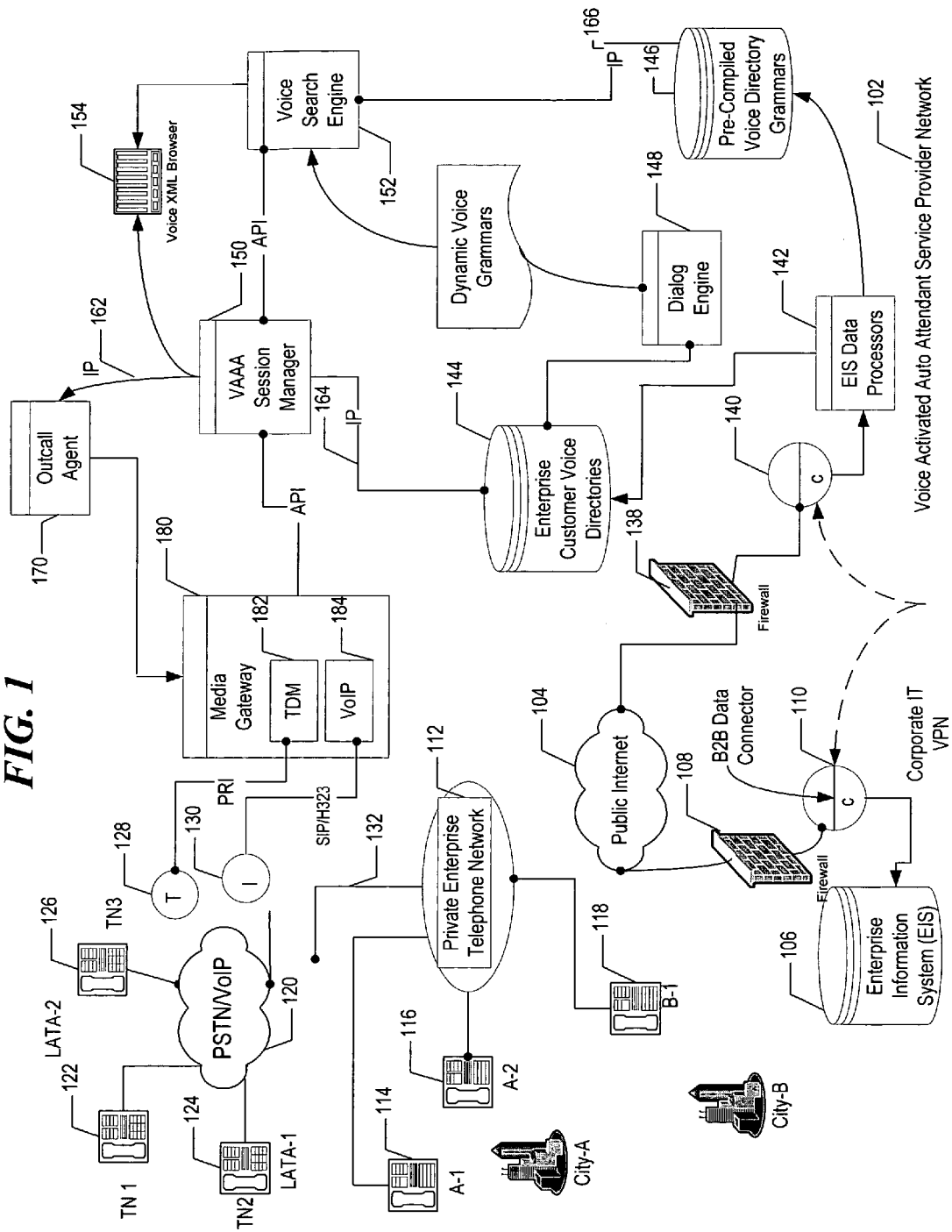
FIG. 1 is a block diagram of a network-based voice activated auto-attendant system.

The techniques disclosed use voice search engine technologies and carrier-based directory services in general and focus particularly on the capability of searching a voice directory entry in a carrier's network with various B2B connectors, via the world wide web (WWW), to enterprise information systems (EIS). The software architecture described is particularly applicable to a broad range of network-based voice hosting services for large enterprises where employees and/or customers can access existing web-centric corporate data via voice-channel (versus desktop) over public switched telephone network (PSTN) and/or voice over internet protocol (VoIP) network edge points.

In a particular embodiment, a network based voice activated auto-attendant system is disclosed. The system includes a voice activated auto-attendant service provider network including an enterprise voice directory, a database of voice directory grammars, and a media gateway having a telephony interface and a data interface. The system further includes a data connector to receive data from a remote enterprise information system and to process the received data for use by the enterprise voice directory and the database of voice directory grammars.

In another embodiment, a method of processing enterprise information system data for use by a voice activated auto-attendant service network is disclosed. The method includes provisioning a network based voice activated auto-attendant service via a web interface including downloading a platform independent business to business (B2B) connector package, interacting with the connector package via a sequence of data modeling steps, selecting a connector based on an enterprise information system data source, and configuring the selected connector. The method also includes encrypting XML data files using an encryption key issued by a network based voice activated auto-attendant service provider, uploading the encrypted XML data files to a secured website hosted on a voice activated auto-attendant service provider network, and parsing the encrypted XML data files at a data processor within the network based voice activated auto-attendant service system to construct a voice directory, to create a first database, and to create a second database. The first database and the second database are configured for run-time access of the voice activated auto-attendant system.

In another embodiment a method of providing a computer-assisted voice service is provided. The method includes receiving a first set of computer system data from a first enterprise information system via a first intermediate data connector, converting the first set of corporate data to define a first set of voice directory data, loading the first set of voice directory data onto a hosted voice services platform, providing an automated interactive voice service to a plurality of external callers using the hosted voice services platform for a plurality of calls, creating and storing a call record for each of the plurality of calls handled by the hosted voice services platform, and generating a bill based on at least one of the call records.

Referring to FIG. 1, an illustrative system is shown. The system includes a voice activated auto-attendant service provider network 102, public internet 104, and the public switch telephone network (PSTN) 120. The system also includes an illustrative corporate network that includes a representative enterprise information system (EIS) 106, a B2B data connector 110, and a corporate firewall 108. The corporate firewall 108 is connected to the public internet 104, which is coupled to the voice activated auto-attendant service provider network 102 via another firewall 138. The system also includes a private enterprise telephone network 112 that is coupled to the PSTN 120 via communication link 132. The PSTN 120 also carries voice over internet protocol (VoIP) traffic and includes a circuit switch telephone interface 128 and a VoIP data interface 130. The telephone interface 128 is coupled to the voice activated auto-attendant service provider network 102 via a communication link, such as a primary rate interface (PRI) interface. The internet traffic interface 130 may by coupled to the voice activated auto attendant service provider network 102 via an internet interface, such as SIP or H. 323.

The PSTN 120 is responsive to calls to and from various telephone devices, such as the illustrated telephones 122, 124, and 126. The private enterprise telephone network 112 may be coupled to telephone communication devices or other similar communication devices such as the illustrated communication devices 114, 116, and 118. These communication devices may be located in different locations and even in different cities or states.

The voice activated auto-attendant service provider network 102 includes an enterprise information system data processor 142, an enterprise voice directory data base 144, a precompiled voice directory grammar database 146, a media gateway 180, a session manager 150, and a voice search engine 152. The voice activated auto-attendant service provider network 102 also includes an outgoing call agent module 170 and the dialog engine 148. The media gateway 180 includes a time division multiplex (TDM) interface 182 coupled to the telephone interface 128 and a VoIP interface 184 that is coupled to the VoIP interface 130. The media gateway 180 is coupled to the session manager 150 via an application programming interface. The media gateway 180 is responsive to calls originated by the outgoing call agent 170, which in turn is responsive to the session manager 150. The service provider network 102 also includes a voice XML browser 154 that receives input from the session manager 150 and from the voice search engine 152. The voice search engine 152 receives data, such as the internet protocol data 166, via the pre-compiled voice directory grammar database 146. The voice search engine 152 also receives dynamic voice grammar information 160 from the dialog engine 148. The dialog engine 148 is coupled to the session manager 150 via an HTTP interface and is coupled to the enterprise voice directory database 144 to retrieve enterprise data. The enterprise voice directory database 144 is coupled to the session manager 150 via data interface 164. The enterprise voice directory database 144 receives processed enterprise data records from the data processor 142. Data processor 142 is coupled via a B2B connector 140 to a remotely located enterprise system, such as the enterprise information system 106 containing corporate data, such as employee records and other corporate personnel information.

During operation, enterprise information originally stored and maintained within the enterprise information system 106 is coupled to the B2B data connector 110 and passed thru various firewalls and through the public internet to be hosted by the voice activated auto-attendant service provider network 102. The B2B data connectors 110 and 140 work together to allow the data to be ported from a specific enterprise data format to a common data format suitable for constructing a voice directory that may be hosted by the voice directory database 144. Once the corporate data has been converted into a suitable voice format it is stored within the enterprise voice directory 144. The voice activated auto-attendant session manager may access such hosted voice directory data in processing incoming calls from the public telephone network 120, via the media gateway 180. In addition, the voice search engine 152 may search through the hosted voice directory for various personnel records in response to a call request. A type of interface that may be used to handle such incoming calls is the voice XML browser 154.

Figure 2:
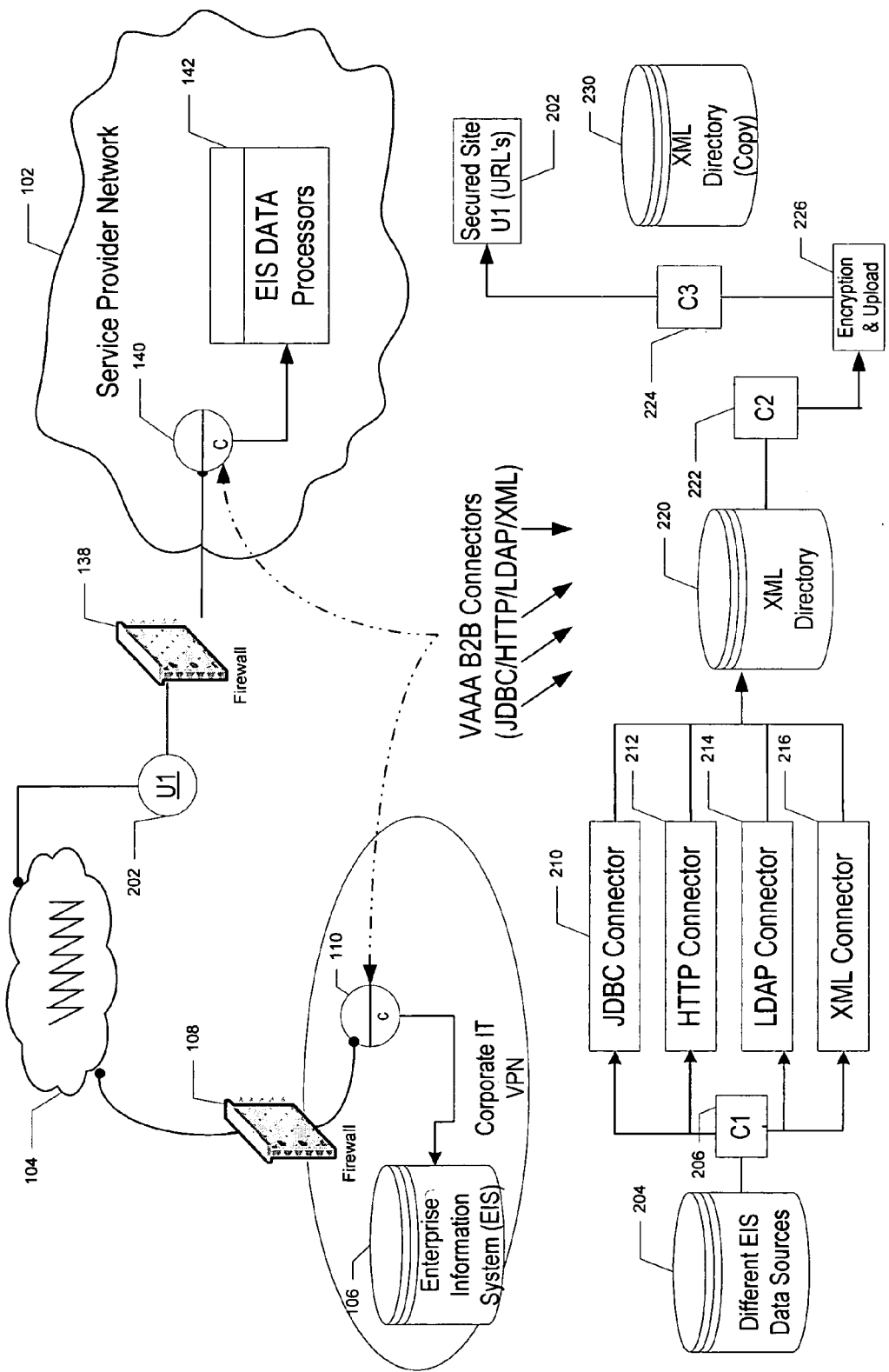
FIG. 2 is a general diagram that illustrates a voice activated auto-attendant system with business to business (B2B) connectors.

Referring to FIG. 2, further details regarding the system of FIG. 1 are shown. The system includes the enterprise information system 106, which is coupled to a B2B data connector 110 via a corporate information technology virtual private network (VPN). This corporate enterprise information system 106 is coupled to the public internet 104 via firewall 108. The public internet 104 is connected to a secured server 202, which in turn is coupled via firewall 138 to the second data connector 140 of the service provider network 102. The service provider network 102 includes data processor 142, which is coupled to the second B2B data connector 140. The communication between the first data connector 110 of the enterprise information system and the second data connector 140 of the voice service provider network 102 is shown in greater detail in FIG. 2. Enterprise information system data sources are illustrated by the database 204 connected to a first data connector 206. The particular type of data connector suitable for the enterprise data is selected. Example connector types include JDBC connector 210, HTTP connector 212, LDAP connector 214, and XML connector 216. Once the appropriate connector type has been selected the data is converted from the data source to a converted XML directory 220. The XML directory 220 is accessible via connector 222 for an encryption and upload module 226. Converted and encrypted data is then uploaded via a communication connector 224 and stored at the secured site 202. Optionally, a copy of the XML directory may be stored in the XML directory database 230. Once the encrypted and uploaded data has been stored at the secured site 202, the encrypted data may then be communicated via the firewall 138 and the data connector 140 for access and processing by the data processor 142 within the voice service provider network 102.

In a particular embodiment, the network based voice service network is provisioned via a web interface where each client, which may be represented as an enterprise customer, first downloads a platform independent B2B connector package. For example, the package can be implemented in Enterprise Java Beans (EJB) for execution on various J2EE application servers to support different computer operating systems. The package can be reached via a local URL since it is installed on a local J2EE application server. From an initial set of provisioning screens, a client administrator may interact with the package via a sequence of data modeling steps. Examples of data modeling steps are labeled connector one (C1) 206, connector two (C2) 222, and connector three (C3) 224 in FIG. 2.

Using data modeling at step 206, a suitable type of data connector may be selected based on the type of enterprise information system data source. For example, if the customer data source is stored in a relational database then the customer can select a JDBC connector and configure this connector to point to the appropriate database tables and corresponding entries. After the connector is fully configured, it can be scheduled to run at a later time. The result of executing this connector is creation of data stored as a set of XML based data files in a format acceptable by the data processor 142. The XML based data files may be stored within XML directory 202. The XML data files may be encrypted using an encryption key that may be issued by the voice service provider network 102. After encryption, the resulting encrypted data may be uploaded from a host server to a secured website, such as the secured website 202 that is hosted on the service provider network via the world wide web. The uploading process may be initiated on the host that has been issued a special security certificate for connection to the secured site 202. Using secured sites and encrypted data may prevent or reduce unauthorized connection or virus attacks to the entry point of the network.

Since there may be thousands of clients sites which may initiate uploading tasks independently, the uploading processes may be divided into multiple small payloads to avoid unpredictable connection patterns associated with public internet traffic. For each successful upload, the encryption and upload module also keeps a local copy in the copy directory 230. At a subsequent time only the differences between the local copy files and the new version to be uploaded is sent to the secured site 202. Once a complete XML data set from a client's site has been received by the secured site 202, it would trigger the data processor 142 to parse the XML data files and start to construct a voice directory. In addition, the XML files are parsed to create and update a first database, such as the enterprise voice directory 144, and a second database, such as the precompiled voice directory grammar database 146, for run-time access.

Figure 3:
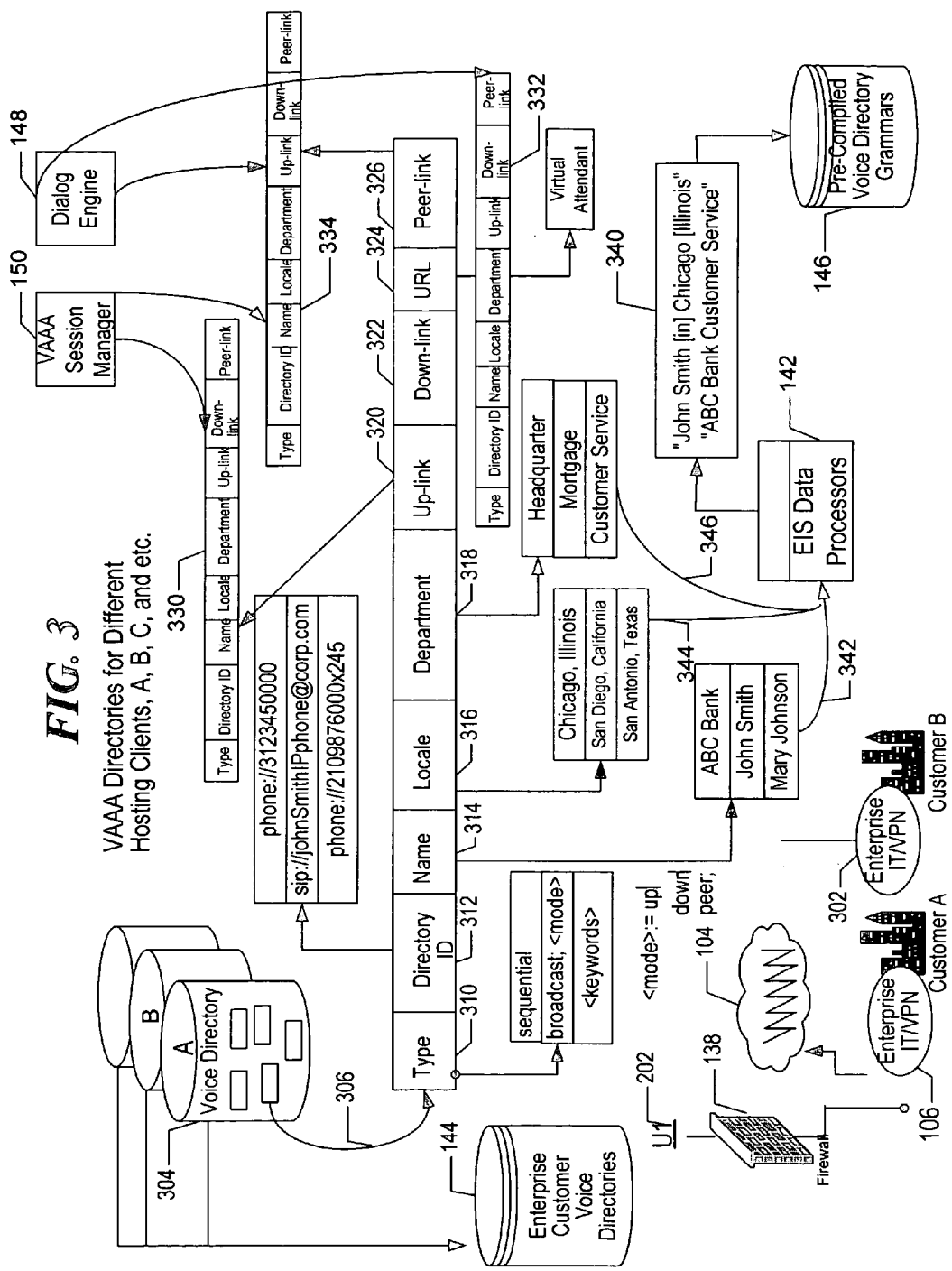
FIG. 3 is a general diagram that illustrates a data structure of a record from a voice directory.

Referring to FIG. 3, a sample data record with many different data fields from a stored voice directory is shown. The voice directories 304 are formed within the enterprise voice directory database 144. The voice directories were constructed from data received at the secured internet site 202. A sample record from one of the voice directories 304 is illustrated in FIG. 3. The sample record includes a plurality of fields, such as a type field 310, a directory ID field 312, a name field 314, a location field 316, a department field 318, an uplink field 320, a downlink field 322, a URL field 324, and a peerlink field 326. The uplink field 320 includes a pointer to a supervisory or reporting to data record 330. The peer link field includes a pointer to a peer data record 334, and the downlink field 322 includes a subordinate data record link to the subordinate data record 332. As illustrated in FIG. 3, sample information from the various fields are shown. For example, the name field 314 may include various names, such as ABC Bank, John Smith or Mary Johnson that may be input to the data processor 142. Similarly, location data from the location field 316 or department information from the department field 318 may also be input and processed by the data processor 142. The processor 142 receives various data information from the voice directory records and uses such information to construct precompiled voice directory grammars within the database 146. In addition, the session manager 150 and the dialog engine 148 may retrieve and access records from the voice directory database 304.

As also illustrated in FIG. 3, individual enterprise customers upload required data elements from their individual enterprise information systems to the voice activated auto-attendant service provider network using the selected B2B connectors. The enterprise information data processors 142 process and then store these data elements in the various databases such as the enterprise voice directory database that stores a centralized voice directory for various different enterprise customers. Voice directories are structured in a common schema that is recognized by both the session manager 150 and dialog engine 148. Three unique links (uplink, downlink, and peerlink) are generated from the original enterprise data records. Each link is constructed to provide additional voice search capabilities for the end users of the network service to meet end user goals. An example is now shown to describe each link and a simple user interface dialogue session.

---

1 Up-link

Service: "This is <company-A-B-C>. Whom would you like to call?"
Caller: "John Smith"
Service: "<ring-but-no-answer-or-busy>. Sorry, the party you called could not come to phone."
Caller: "Can I talk to his supervisor?"
Service: "<check-permission-for-upLink-if-yes> yes, let me try that number, please hold"

2 Down-link

Service: "This is <company-A-B-C>. Whom would you like to call?"
Caller: "Mary Johnson"
Service: "<ring-but-busy>. Sorry, the party you called is busy."
Caller: "Can I talk to anyone in her group"
Service: "<check-permission-for-downLink-if-yes> yes, let me try a staff in her group, please hold"

3 Peer-link

Service: "This is <company-A-B-C. Whom would you like to call?"
Caller: "Customer service"
Service "Do you know your customer rep's name?"
Caller: "Mary Jones"
Service: "<try-to-ring-Jones-but-got-busy>. She is with another customer, let me try another customer service representative. Please hold"

---

Figure 4:
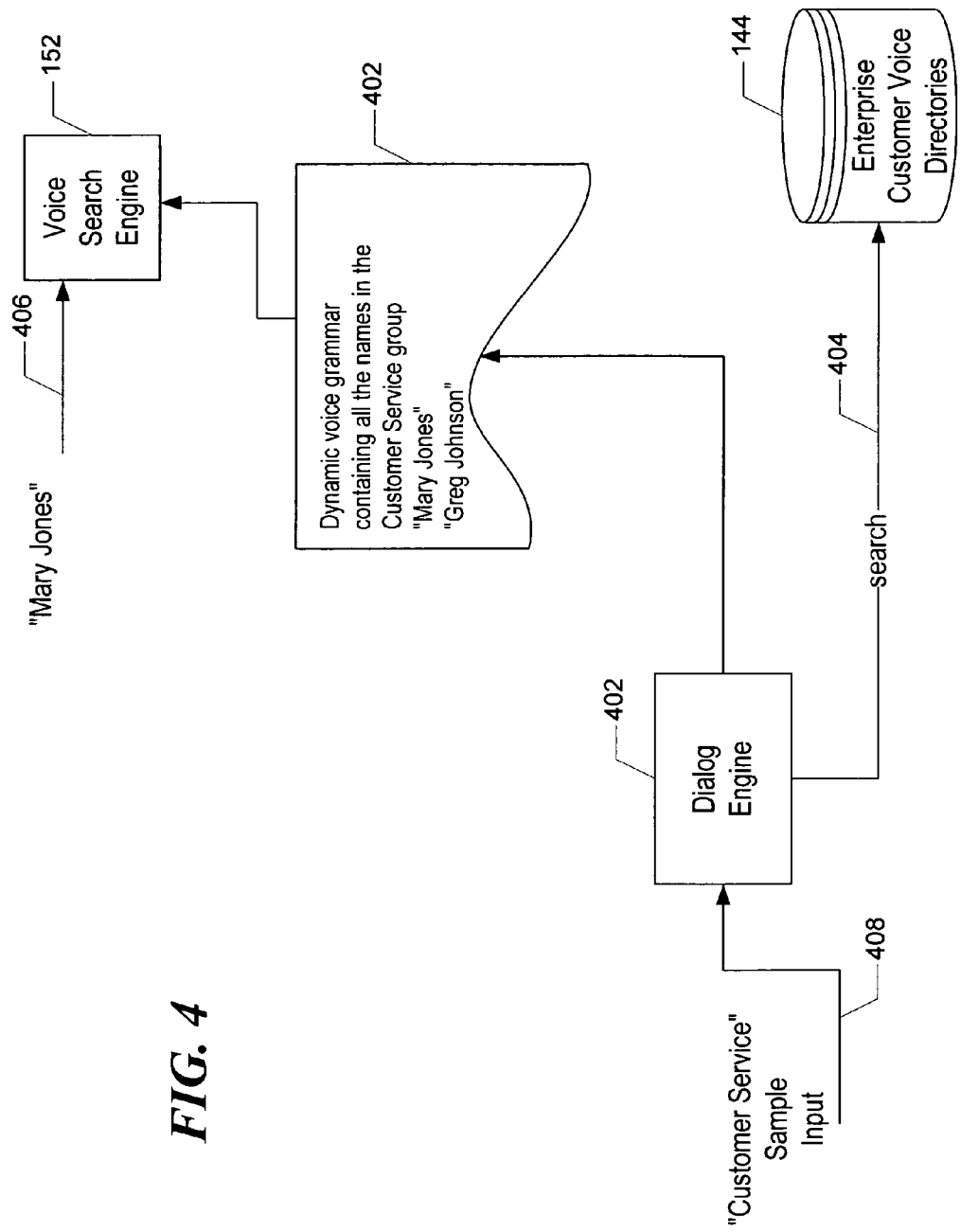
FIG. 4 is a general diagram that illustrates a voice search engine.

Referring to FIG. 4, a further example of using the voice service network 102 in connection with the user interface call recognition sample dialog is shown. A caller may request general information and may be asked by the voice service network for further information, such as to provide information regarding a particular target addressee, such as a department of a requested employee. For example, where a caller requests a customer service department, the dialog engine 148 receives the input "customer service". The dialog engine initiates a search 404 of the enterprise voice directory 144 based on the department name of "customer service." The database may then retrieve a dynamic voice grammar that contains the names of employees in the "customer service" group, such as Mary Jones or Greg Johnson, as shown at 402. The dialog engine provides the names of available personnel within the customer service group and provides this information using the voice search engine 152. Based on a second customer input, such as "Mary Jones" at 406, the voice search engine 152 may search and then identify the specific data record for "Mary Jones" from the available personel list, at 402. The voice activated auto-attendant service provider network may then provide further details regarding Mary Jones and may route the call to the appropriate destination, such as to Mary Jones' telephone or work station.

Figure 5:
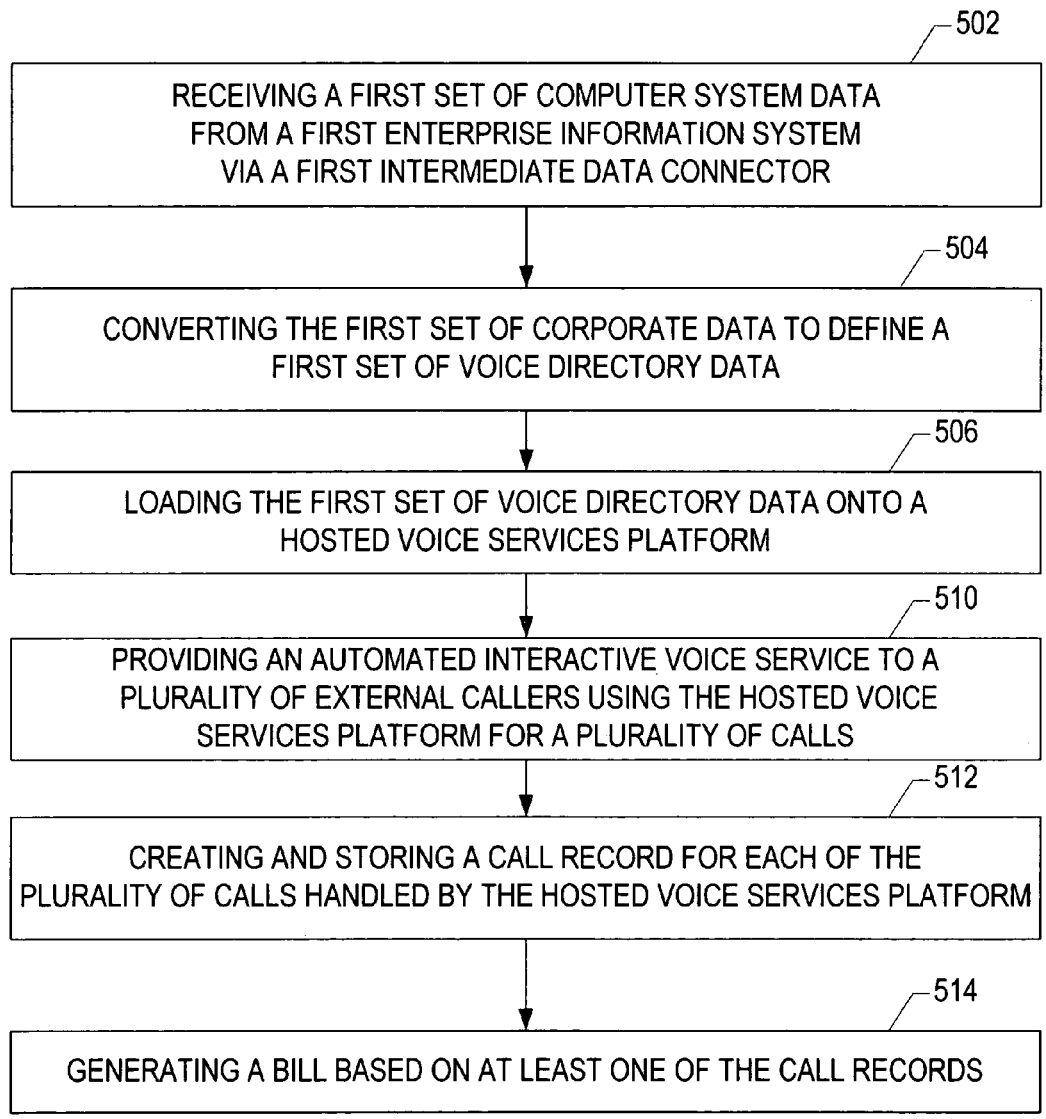
FIGS. 5-7 are flowcharts that further illustrate operation of the network-based voice activated auto-attendant system of FIG. 1.

Referring to FIG. 5, a method of providing computer assisted voice service is shown. The method includes receiving a first set of computer system data from a first enterprise information system via a first intermediate data connector, at 502. The first set of corporate data is then converted to define a first set of voice directory data, at 504. The first set of voice directory data is loaded onto a hosted voice services platform, at 506. Automated interactive voice service is then provided to a plurality of external callers using the hosted voice services platform to handle a plurality of calls, as shown at 510. A call record is then created and stored for each of the plurality of calls handled by the hosted voice services platform, at 512. A bill may be generated for offering the service and the bill may include data retrieved from the call records, as shown at 514.

Figure 6:
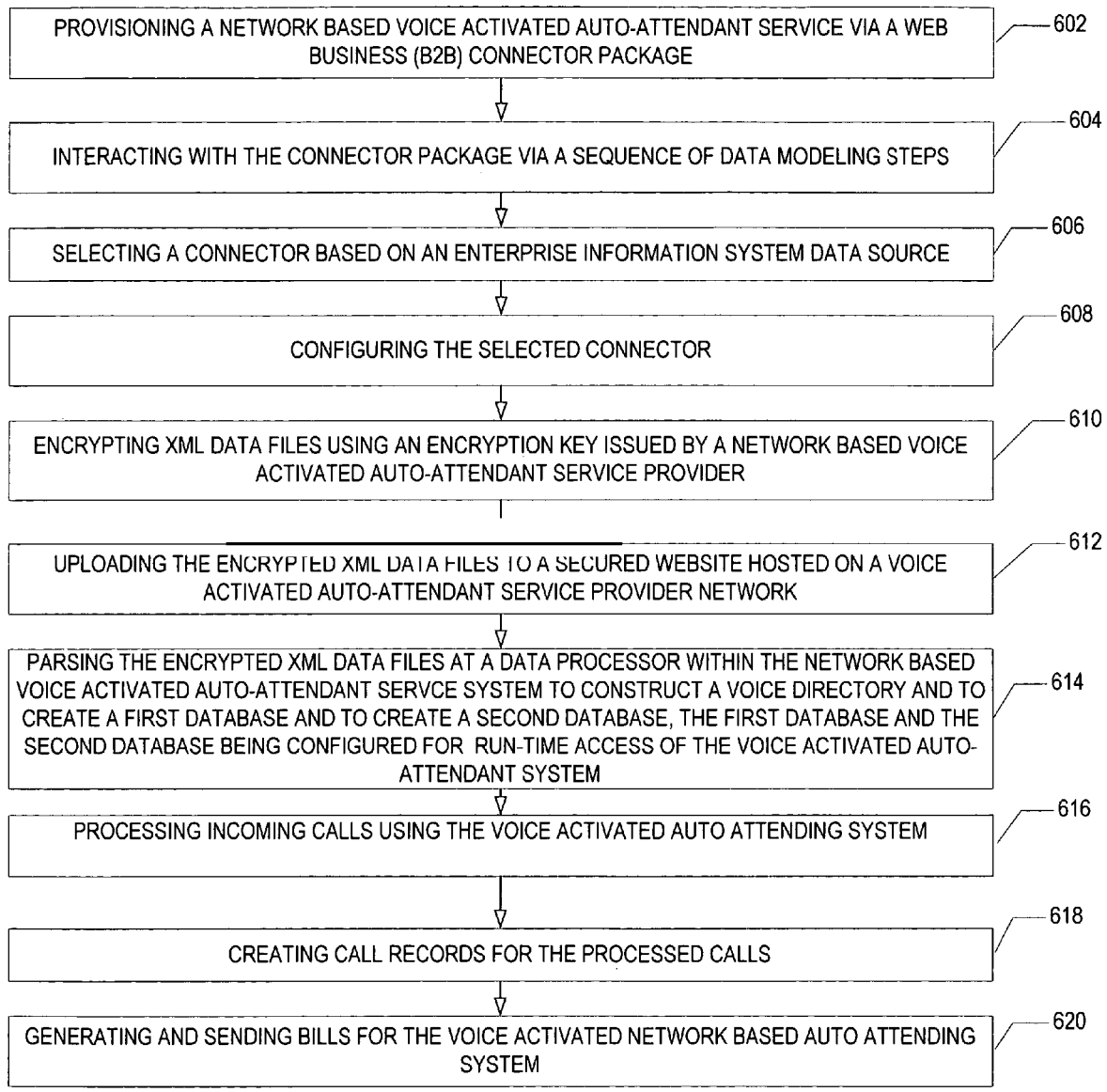

Referring to FIG. 6, a sample method of processing enterprise information system data for use by a voice activated auto-attendant service network is shown. The method includes provisioning a network based voice activated auto-attendant service via a web interface, at 602. The provisioning step includes downloading a platform independent business to business (B2B) connector package. The method includes interacting with a connector package via a sequence of data modeling steps, at 604. A connector is then selected based on a particular enterprise information system data source, at 606, and the selected connector is configured, at 608. XML data files resulting from an output of the data connector are encrypted using an encryption key issued by a network-based voice activated auto-attendant service provider, at 610. The resulting encrypted XML data files are uploaded to a secured website that may be hosted on a voice activated auto-attendant service provider network, at 612. The encrypted XML data files are parsed, at 614 to form a voice directory and to create a first database and a second database. An example of the first database is the enterprise voice directory 144 and an example of the second database is the voice grammar database 146. Incoming calls are then processed and handled by the voice activated auto-attending system, as shown at 616. The voice activated auto-attendant system has access to the voice directory and to the first and second database during call processing and routing while carrying out the service. Call records for each of the processed calls are then created at 618, and a bill is generated based on the processed call records, at 620.

Figure 7:
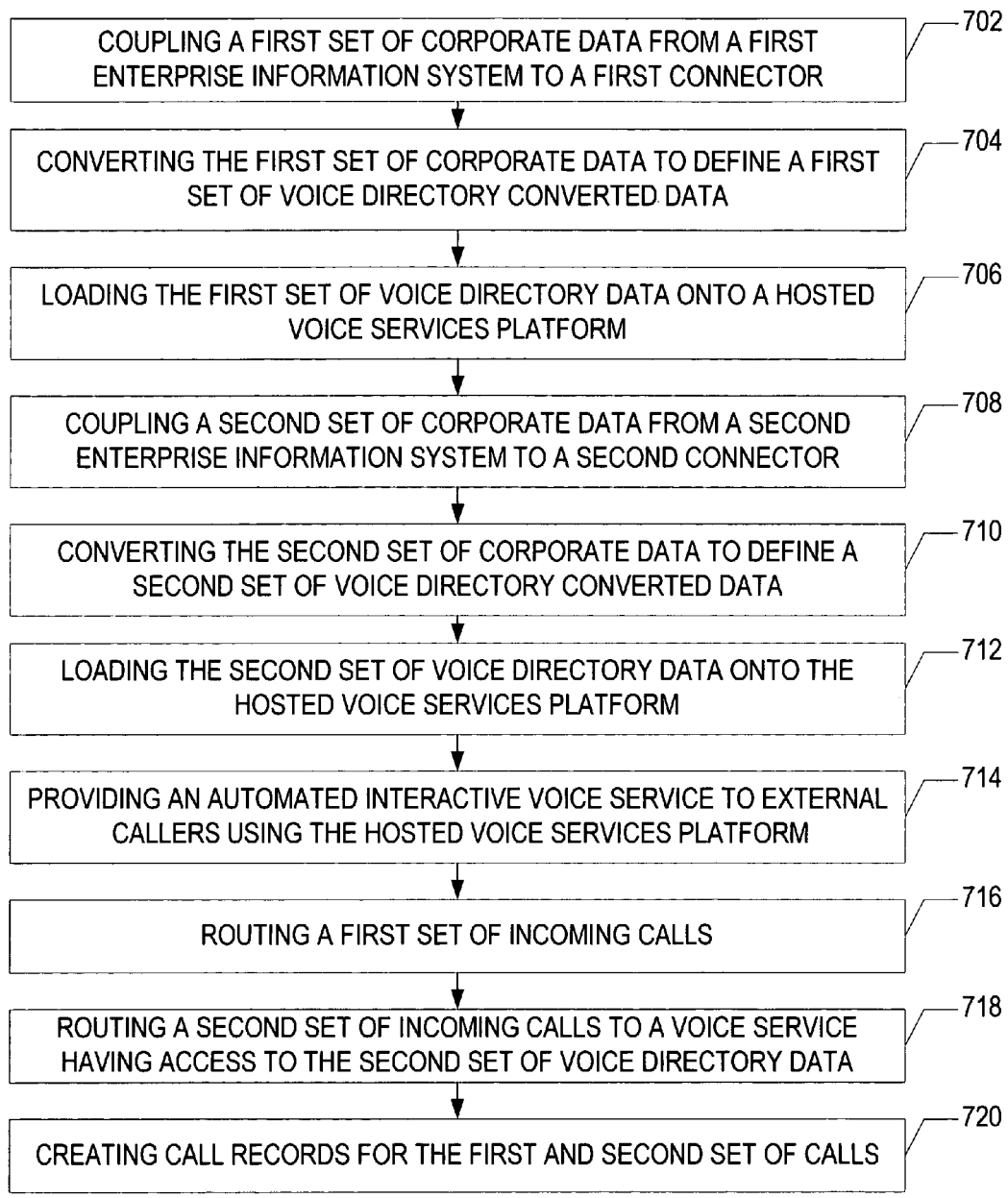

A method of processing data for use of a voice services network is shown in FIG. 7. The method includes coupling a first set of corporate data from a first enterprise information system to a first connector, at 702. The method further includes converting the first set of corporate data to define a first set of voice directory converted data, at 704, and loading the first set of voice directory data onto a hosted voice services platform, at 706. The method further includes coupling a second set of data to a second data connector and converting the second set of data to define a second set of voice directory converted data, at steps 708 and 710. The second set of voice directory data is then loaded onto the hosted voice services platform, at 712. The method further includes providing an automated interactive voice service to external callers using the hosted voice services platform, as shown at 714. During use of the voice services platform, a first set of incoming calls is routed to a voice service that has access to the first set of voice directory data, at 716. Further, a second set of incoming calls are routed to a second service that has access to the second set of voice directory data, at 718. Call records are then created for the first and second set of calls, as shown at 720.

The illustrated system and method describe a network based voice activated auto-attending system that may provide enterprises with increased directory services and access to legacy enterprise system data. An enhanced computer-based voice services platform for handling enterprise call directory traffic has been disclosed.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
  a voice activated auto-attendant service provider network including an enterprise voice directory, a database of voice directory grammars, and a media gateway having a telephony interface and a data interface, each entry in the enterprise voice directory containing at least one link to another entry in the enterprise voice directory; and
  a data processor coupled to the enterprise voice directory and coupled to a data connector, the data processor to construct the enterprise voice directory by executing instructions to:
    receive data from a remote enterprise information system via the data connector;
    convert the received data from an enterprise data format to extended Markup Language (XML)-based files;
    encrypt the XML-based files using an encryption key issued by the voice activated auto-attendant service provider network to form encrypted XML-based files;
    store the encrypted XML-based files in a manner that is accessible to the voice activated auto-attendant service provider network; and
    create the enterprise voice directory based on the encrypted XML-based files, the enterprise voice directory configured for run-time access by the voice activated auto-attendant service provider network.

2. The system of claim 1, wherein the data interface of the media gateway is a voice over internet protocol (VoIP) interface.

3. The system of claim 1, wherein a firewall is disposed between the data connector and the remote enterprise information system.

4. The system of claim 1, wherein the voice activated auto-attendant service provider network further comprises a voice search engine and a session manager, the voice search engine being responsive to the database of voice directory grammars and the session manager being responsive to the enterprise voice directory.

5. The system of claim 4, wherein the voice activated auto-attendant service provider network further comprises a voice browser that is responsive to the session manager and responsive to the voice search engine, the voice browser capable of browsing the enterprise voice directory using the at least one link to another entry in the enterprise voice directory.

6. The system of claim 5, wherein the voice browser is a voice XML browser.

7. The system of claim 4, wherein the voice search engine is responsive to dynamically generated voice grammars provided by a dialog engine coupled to the enterprise voice directory.

8. The system of claim 1, wherein the voice activated auto-attendant service provider network further comprises an outgoing call agent in communication with the media gateway.

9. The system of claim 1, wherein the media gateway is coupled to a public switched telephone network (PSTN).

10. The system of claim 1, wherein a second data connector is coupled to the remote enterprise information system and wherein the second data connector is remotely located with respect to the data connector.

11. The system of claim 10, wherein the second data connector is coupled to the remote enterprise information system via a virtual private network connection.

12. The system of claim 11, further comprising a secured website, the secured website coupled to the data connector via a firewall, the secured website also coupled to a world wide web.

13. The system of claim 1, wherein a second data connector is coupled to the remote enterprise information system and wherein the second data connector is selected based on the type of data in an enterprise information data source that is included in the remote enterprise information system, wherein the second data connector is used to convert data to a format compatible with the voice activated auto attendant service provider network.

14. The system of claim 1, wherein the data connector receives data in XML format to be subsequently parsed to construct the enterprise voice directory.

15. The system of claim 1, wherein the enterprise voice directory includes a record with a type field, a directory ID field, a name field, and a location field.

16. The system of claim 7, wherein one of the dynamically generated voice grammars contains a name of a person in a group to which the person belongs.

* * * * *